Oct. 3, 1967     R. W. HAUTZENROEDER     3,345,506

WARNING LIGHT FOR TRACTORS AND IMPLEMENTS

Filed July 19, 1965

INVENTOR.
RICHARD W. HAUTZENROEDER
BY
Tweedale & Gerhardt
ATTORNEYS.

United States Patent Office 3,345,506
Patented Oct. 3, 1967

3,345,506
WARNING LIGHT FOR TRACTORS AND IMPLEMENTS
Richard W. Hautzenroeder, Detroit, Mich., assignor to Massey-Ferguson Inc., Detroit, Mich., a corporation of Michigan
Filed July 19, 1965, Ser. No. 472,770
4 Claims. (Cl. 240—8.18)

ABSTRACT OF THE DISCLOSURE

A vehicle warning light having a lamp housing made up of complementary moulded plastic lenses with an opening formed in the base of the housing for receiving a lamp support. The opening is formed with slots for receiving projections on the support so that the support can be inserted though the opening and the projections displaced from the slots as seated between moulded abutments when the assembly is clamped to a support. Special tools are not required for assembly and disassembly of the lamp for servicing and replacement of bulbs.

---

This invention relates generally to vehicle warning lights and is particularly concerned with safety lights for tractors and implements pulled thereby, when operated on public roads either day or night. Such lamps are normally carried on the left rear tractor fender in a tapered socket, and in accordance with SAE and ASAE recommended practice, flash on and off similar to automobile direction signals and is required to show amber to the front and red to the rear and be visible from either side. When implements or wagons are pulled behind the tractor, the lamp is removed from the tractor fender and mounted at the extreme left and rear of the implement as far as practical. Sufficient cable must be provided to allow the lamp to be moved from the tractor to the trailed implement.

Presently available warning lamps have generally been of such complex and costly construction as to seriously discourage their usuage. Moreover, to merely remove and replace bulbs requires special tools and is unduly time consuming.

It is therefore an object of this invention to provide a warning and safety light for tractors and similar vehicles that can be completely assembled and disassembled with a minimum amount of skill and effort.

Another object is to provide a vehicle warning lamp that is economical to manufacture, has a minimum number of parts, and is simple to assemble and disassemble for servicing.

In accordance with the present invention, a pair of complementary shaped lenses of moulded plastic material are secured together in opposed relationship to define a hollow lamp housing. The base portion of the lamp housing is formed with an opening through which a tubular support member is inserted to project into the interior of the lamp housing and support an incandescent bulb. The tubular support member is supported in the lamp housing by a washer or flange secured to or formed integrally with the tubular member and having radially extending tongues which overlie the interior surface of the base portion surrounding the opening. Longitudinal slots in the wall of the base opening receive the tongues and permit the support member to be removed from the housing. When the tongues are inserted into the housing through the slots, rotation of the tubular member displaces the tongues from the inner end of the slots and a wing nut on the exterior end of the tubular member cooperates with the tongues to clamp the lamp housing to a support which may be in the form of a reel having a suitable length of electrical cable wound around it to permit the lamp to be removed from the tractor. The tongues of the support washer are received between spaced axially projecting abutments to prevent undesired rotation of the support member caused by vibration.

Other objects, features and advantages of the invention will become apparent from the following description taken in connection with the accompanying drawings in which.

Figure 1:
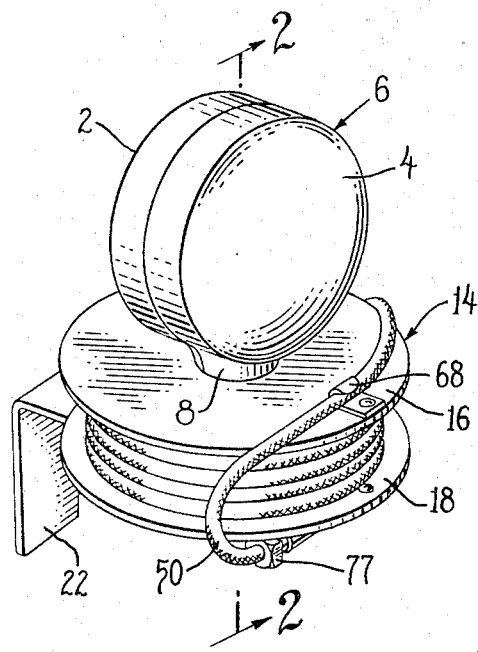
FIG. 1 is a perspective view of a lamp assembly embodying the invention.
Figure 3:
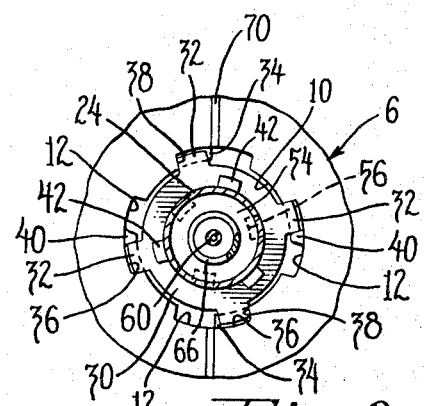
FIG. 3 is a sectional detail view taken on lines 3—3 of FIG. 2.

At the outset, it should be understood that while a specific embodiment of the invention is described and illustrated in the specification and drawings, the invention is not limited to the specific construction shown but that other forms may be adopted without departing from the scope and spirit of the invention.

With reference to the drawings, a pair of complementary shaped lenses 2 and 4 are joined together at their peripheries in opposed relationship to form a hollow lamp housing 6 having a base portion 8 provided with an axial opening 10. Formed in the wall of opening 10 is a plurality (in this case 4) of longitudinal slots 12 extending throughout the axial length of opening 10.

The lamp housing 6 is mounted on a support 14 in the form of a reel having upper and lower plates 16 and 18, respectively, secured together by a hollow shaft or spacer 20. The lower plate 18 of the reel is attached to a mounting bracket 22 for engagement with a dovetail slot or socket on a tractor implement.

Mounted in opening 10 and extending through shaft 20 is a tubular support member 24 one end of which projects into the interior of housing 6 and is provided with conventional bayonet slots 26 for supporting an incandescent bulb 28. The tubular support member 24 is secured against withdrawal from within the lamp housing 6 by a support washer 30 formed with a plurality (in this case 4) of tabs or tongues 32 projecting radially outwardly from the washer and overlying the interior surface of the base member surrounding opening 10. In the assembled position illustrated in FIG. 2, tongues 32 are each supported on a shoulder or ledge 34 defined by the bottom wall of a groove 36 extending part way through opening 10 from the interior of the housing. The tubular support member 24 is inserted into the housing by aligning the tabs 32 with slots 12. After the tabs 32 pass through slots 12 into the lamp housing, tubular member 24 is rotated to move the tabs out of alignment with slots 12 and the tabs are seated on the shoulders or ledges 34 between a pair of abutments, one on each side of each tab, defined by the side wall 38 of groove 36 and a projection 40 on shoulder 34 spaced from the side wall 38. Hence, in order to remove the support member 24 from lamp housing 6, tabs 32 must be moved upwardly as viewed in FIG. 2 to disengage the tabs from abutments 38 and 40, after which the tube is rotated until tabs 32 are received in slots 12.

Figure 2:
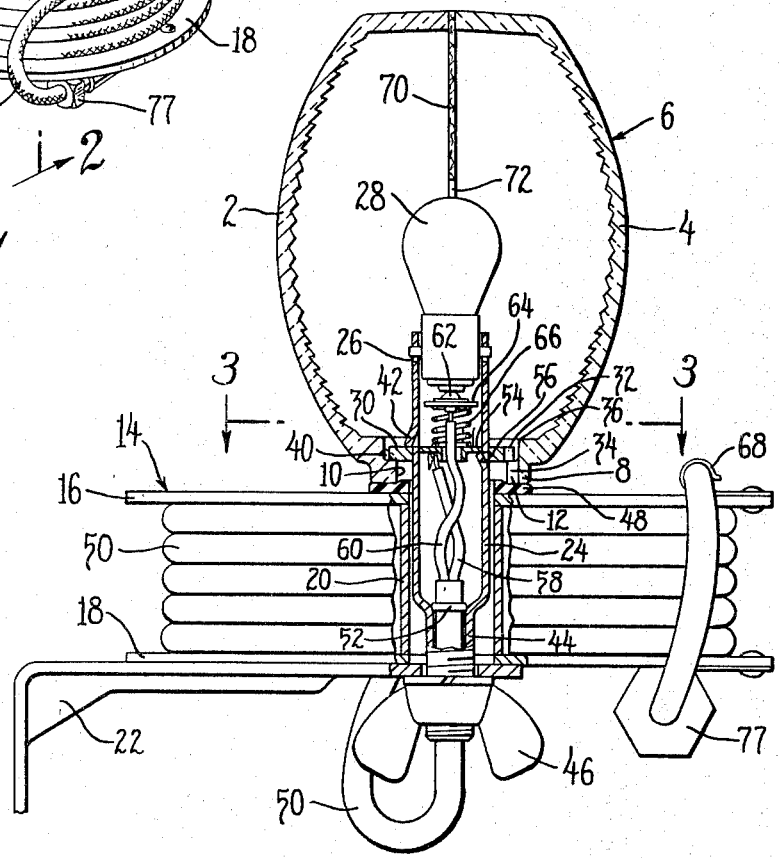
FIG. 2 is a sectional view of the lamp assembly of FIG. 1.

Support washer 30 engages a plurality of outwardly struck tangs or stops 42 on its upper side as viewed in FIG. 2 and may be secured in position by soldering, brazing, staking, or other conventional means. Alternatively, the tongued washer 30 may be die cast integrally with tubular member 24.

The end of tubular member 24 opposite the lamp housing is reduced in diameter as indicated at 44 and is externally threaded for receiving a wing nut 46 which cooperates with tabs 32 for adjustably clamping base member 8 onto support reel 14. A resilient gasket 48 is interposed between the lower edge of base portion 8 and upper plate 16 for excluding dust and moisture from the inside of the lamp housing. A suitable length of cable 50, usually about 22 feet, is wound around reel 14 with one end inserted in the reduced portion 44 of tubular member 24. Withdrawal of the end of cable 50 from support member 24 is prevented by a locking ring 52 pressed on to the end of the cable which engages the shoulder defined by the reduced portion 44.

Seated within the tubular support member on a plurality of inwardly struck tangs or stops 56 is a spring support and ground connection 54. One wire 58 of cable 50 is secured to the spring support 54 and the other wire 60 extends through a central opening in member 54 into connection with an electrical contact 62 carried by an insulating washer 64. Washer 64 is supported on a spring 66, the lower end of which is seated on the spring support member 54. Spring 66 serves to maintain electrical contact between the bulb 28 and contact 62.

To assemble the lamp and reel, cable 50 is threaded through reduced portion 44 of the tubular member 24 from the top (as viewed in FIG. 2) until locking ring 52 engages the upper portion of the reduced portion 44. The cable is then threaded through gasket 48, shaft 20 and wing nut 46 and a standard connector 77 is attached to the end of the cable opposite the lamp. The unused length of cable is wound on the reel, with the free end partially supported in a spring clip 68 on the upper plate 16 of the reel. With bulb 28 mounted in bayonet slots 26, member 24 is inserted into the lamp housing 6 by passing tabs 32 through slots 12 and rotating the member 24 until tabs 32 are seated on ledges 34. Wing nut 46 is then tightened to secure the parts together in assembled relationship.

To remove the lens assembly for replacement of a burned out bulb, it is necessary merely to loosen wing nut 46 and push member 24 upwardly sufficiently for tabs 32 to disengage from abutments 38 and 40 permitting the lamp housing to be rotated relative to member 24 to bring tabs 32 into alignment with slots 12 whereupon the lamp housing can be withdrawn from the assembly. The burned out bulb 28 is then simply removed from bayonet slots 26 and replaced with a new bulb and the lamp reassembled as described above.

Lenses 2 and 4 are preferably moulded in one piece from strong, tough, polycarbonate material in a mould requiring no cores. Preferably, one of the lenses 2 and 4 is red and the other is amber. Bulb 28 may be a standard single filament light bulb of a candle power equivalent to an auto stop light.

In order to prevent sunlight from coming through one lens and making the opposite lens bright enough to subdue the flashing effect, a planar opaque lens 70 may be secured between lenses 2 and 4. Lens 70 is formed with a slot 72 for accommodating the bulb 28 and support tube 24. Lenses 2, 4 and 70 are cemented, fused or welded together to form a unitary, two color, lamp housing.

In the illustrated embodiment, the tubular member 24 is swaged or drawn to form the reduced portion 44 which is then threaded in a separate operation to receive wing nut 46. Bayonet slots 26 and stops 42 and 56 are punched out of the tubular material. However, it is within the scope of this invention that member 24 and the tongued washer 30 can be die cast as one integral piece with the bayonet slots, stops 56 and external threads on reduced portion 44 formed in the die casting operation. Die casting these elements in a single operation may be particularly advantageous from a cost standpoint for large quantity production.

Other equivalent forms and alterations in the construction and arrangement of parts, all falling within the scope of the invention as defined by the appended claims, will be apparent to those skilled in the art.

What is claimed is:

1. A vehicle warning lamp assembly, comprising: a pair of complementary, translucent lenses secured together in opposed relationship to define a hollow lamp housing having a base portion with an opening formed therein; a tubular support member received in said opening having a portion projecting into the interior of the lamp housing for supporting an incandescent lamp; a tongue on said tubular support intermediate its ends projecting radially outwardly beyond the periphery of the opening and overlying the interior surface surrounding said opening; a slot formed in the wall of said opening for receiving said tongue and permitting the tubular support to be removed from said lamp housing; a pair of spaced abutments formed on the interior surface of the lamp housing adjacent said opening and engaging opposite sides of said tongue to prevent rotation of said tongue into engagement with said slot; and adjustable clamping means on said tubular support cooperable with said tongue to prevent axial movement of said tubular support relative to said opening and disengagement of said tongue from said abutments.

2. A vehicle warning lamp assembly comprising: a support reel having upper and lower plates concentrically secured together in spaced relationship by a hollow shaft; a pair of complementary translucent lenses joined together in opposed relationship to define a hollow lamp housing having a base portion with an opening therein; a tubular support member loosely received in said opening with one end projecting into the interior of the lamp housing and the other end extending through the hollow shaft of said reel; a plurality of circumferentially spaced slots in the wall of said lamp housing base opening extending throughout the axial length thereof; a plurality of radially projecting tongues equal in number to said slots, extending outwardly from said tubular support member and extending beyond the periphery of the opening for engagement with the inner surface of the base member surrounding said opening; a plurality of grooves equal in number to said tongues and slots in the wall of said opening extending part way along the axial length of said opening from the interior of the housing; and receiving said tongues; said grooves being displaced circumferentially from said slots; adjustable means on the other end of said tubular support means engageable with said lower plate to cooperate with said tongues to clamp the housing, tubular support member and reel in assembled relationship with the base member sealed against said upper plate; an incandescent bulb detachably mounted on said one end of said tubular support member; said tubular support member being movable axially with respect to the housing and reel to disengage the tongues from said grooves upon loosening of said adjustable means and thereafter rotatable to engage said tongues in said slots permitting withdrawal of the tubular support member from the lamp housing.

3. A vehicle warning lamp assembly as defined in claim 2 wherein said other end of said tubular support member is reduced in diameter and is externally threaded for receiving said adjustable means; and further including an electrical cable wound around said hollow shaft between said upper and lower plates with one end received in said other end of the tubular support member; a retaining ring on said one end of the cable engaging the internal shoulder defined by said reduced diameter portion; and means electrically connecting said one end of the cable with said incandescent bulb.

4. A vehicle warning lamp assembly as defined in claim 3 further including a planar, opaque lens interposed between said trnaslucent lenses for shielding each of said translucent lenses from external light passing through the other translucent lens, and a slot in said opaque lens for receiving said bulb and tubular support member.

References Cited

UNITED STATES PATENTS

| 2,853,595 | 9/1958 | Baldwin | 240—8.2 |
| 2,981,828 | 4/1961 | Worden | 240—8.18 |
| 3,246,136 | 4/1966 | Cheng | 240—8.22 |
| 3,275,816 | 9/1966 | Brunger | 240—8.22 |

FOREIGN PATENTS

| 1,372,026 | 8/1964 | France. |

NORTON ANSHER, *Primary Examiner.*

D. L. JACOBSON, *Assistant Examiner.*